(12) United States Patent
Rotari et al.

(10) Patent No.: US 10,878,716 B2
(45) Date of Patent: Dec. 29, 2020

(54) KEYBOARD FINGER GUIDE

(71) Applicants: Eugeniu Rotari, Orlando, FL (US); Nasreldin Iehab Hamid, Orlando, FL (US)

(72) Inventors: Eugeniu Rotari, Orlando, FL (US); Nasreldin Iehab Hamid, Orlando, FL (US)

(73) Assignee: Eugeniu Rotari, Orlando, FL (US)

( * ) Notice: Subject to any disclaimer, the term of this patent is extended or adjusted under 35 U.S.C. 154(b) by 311 days.

(21) Appl. No.: 15/984,188

(22) Filed: May 18, 2018

(65) Prior Publication Data

US 2019/0355273 A1    Nov. 21, 2019

(51) Int. Cl.
*G09B 13/04* (2006.01)
*G06F 3/02* (2006.01)

(52) U.S. Cl.
CPC ........... *G09B 13/04* (2013.01); *G06F 3/0224* (2013.01)

(58) Field of Classification Search
CPC ................................. G09B 13/00; G09B 13/04
USPC .......... 434/227–233; 400/715; D18/12, 12.2; D19/59, 62
See application file for complete search history.

(56) References Cited

U.S. PATENT DOCUMENTS

| | | | | |
|---|---|---|---|---|
| D22,971 S | * | 12/1893 | Terry | D18/12 |
| 1,008,591 A | * | 11/1911 | Peakes | G06F 3/0202 400/714 |
| 1,377,070 A | * | 5/1921 | Helguera | G09B 13/04 400/715 |
| 1,560,020 A | * | 11/1925 | Curley | G09B 13/04 434/227 |
| 1,937,067 A | * | 11/1933 | Parker | G09B 13/04 400/715 |
| 2,491,332 A | * | 12/1949 | Potter | G09B 13/04 400/715 |
| 2,800,727 A | * | 7/1957 | Potter | G09B 13/04 434/227 |
| 3,229,800 A | * | 1/1966 | Krag | G09B 13/04 400/715 |
| 4,075,465 A | * | 2/1978 | Funk | B41J 5/102 200/309 |
| D300,040 S | * | 2/1989 | Dermody | 400/715 |
| 5,286,125 A | * | 2/1994 | DiGiosia | B41J 5/10 400/472 |
| D395,450 S | * | 6/1998 | Drumm | D14/454 |
| 6,644,975 B2 | * | 11/2003 | Heckmann, Jr. | G09B 13/02 434/227 |

* cited by examiner

*Primary Examiner* — Kurt Fernstrom
(74) *Attorney, Agent, or Firm* — Jason T. Daniel, Esq.; Daniel Law Offices, P.A.

(57) ABSTRACT

A keyboard finger guide includes two or more elongated planar guides that are in a parallel orientation to each other. A plurality of curvilinear dividers is secured to the guides in a perpendicular orientation and provide a tactile guide to align fingers on a keyboard. The upper surface of the dividers can include a nonabrasive and malleable material, or the dividers can be completely constructed from a malleable material so as to allow the shape of the device to conform to variances in keyboard manufacture and designs.

14 Claims, 3 Drawing Sheets

KEYBOARD FINGER GUIDE

TECHNICAL FIELD

The present invention relates generally to computer accessories, and more particularly to a finger guide for a keyboard.

BACKGROUND

The statements in this section merely provide background information related to the present disclosure and may not constitute prior art.

As technology becomes increasingly integrated to our everyday life, the need to type accurately has never been more important. Although most avid computer users are capable of typing fast and accurately in optimum conditions such as when the keyboard is on a flat level surface and ample lighting is available, the job of typing accurately becomes more difficult in less than optimum conditions and/or when the keyboard is out of direct sight as may occur if the user is wearing a virtual reality headset, for example.

For example, when working in low light conditions, such as at home or in a restaurant, for example, users who know how to properly type may find it more difficult to properly arrange their fingers on the keyboard. When this occurs, many mistakes are made, and the user must spend a significant amount of time correcting the errors.

Although there are many known keyboard guide devices which include rigid frames extending far above the keyboard to teach new users proper hand and finger placement, such devices are not ideal for experienced users who need a flexible guide that can aid in low light situations.

The present invention, directed to a keyboard finger placement guide differs from the conventional art in a number of aspects. The manner by which will become more apparent in the description which follows, particularly when read in conjunction with the accompanying drawings.

SUMMARY OF THE INVENTION

The present invention is directed to a keyboard finger guide device. One embodiment of the present invention can include two or more elongated planar guides that are positionable between rows of a keyboard. A plurality of curvilinear dividers can be secured to the guides in a perpendicular orientation and can run vertically between the keys of the keyboard.

When positioned onto a keyboard, the device can provide a user with a tactile guide to align their fingers on a keyboard when the same is not visible.

In another embodiment of the present invention, the upper surface of the dividers can include a nonabrasive and malleable material that can bend to accommodate laptop screens.

In yet another embodiment of the present invention, the dividers can be completely constructed from a malleable material so as to allow the shape of the device to conform to variances in keyboard manufacture and designs.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described throughout this document, the term "keyboard" can include any panel having a series of keys for use with any device such as a desktop computer, laptop computer, and/or typewriter, among others for example.

As described herein, the term "removably secured" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnets, and/or compression fittings such as clips or clamps, for example.

As described herein, the term "permanently secured" and derivatives thereof shall be used to describe a situation wherein two or more objects are joined together in a manner that is intended to prevent the same objects from being separated. Several nonlimiting examples include various adhesives such as glue or resin, welds, and/or through known manufacturing techniques, for example.

Figure 1:
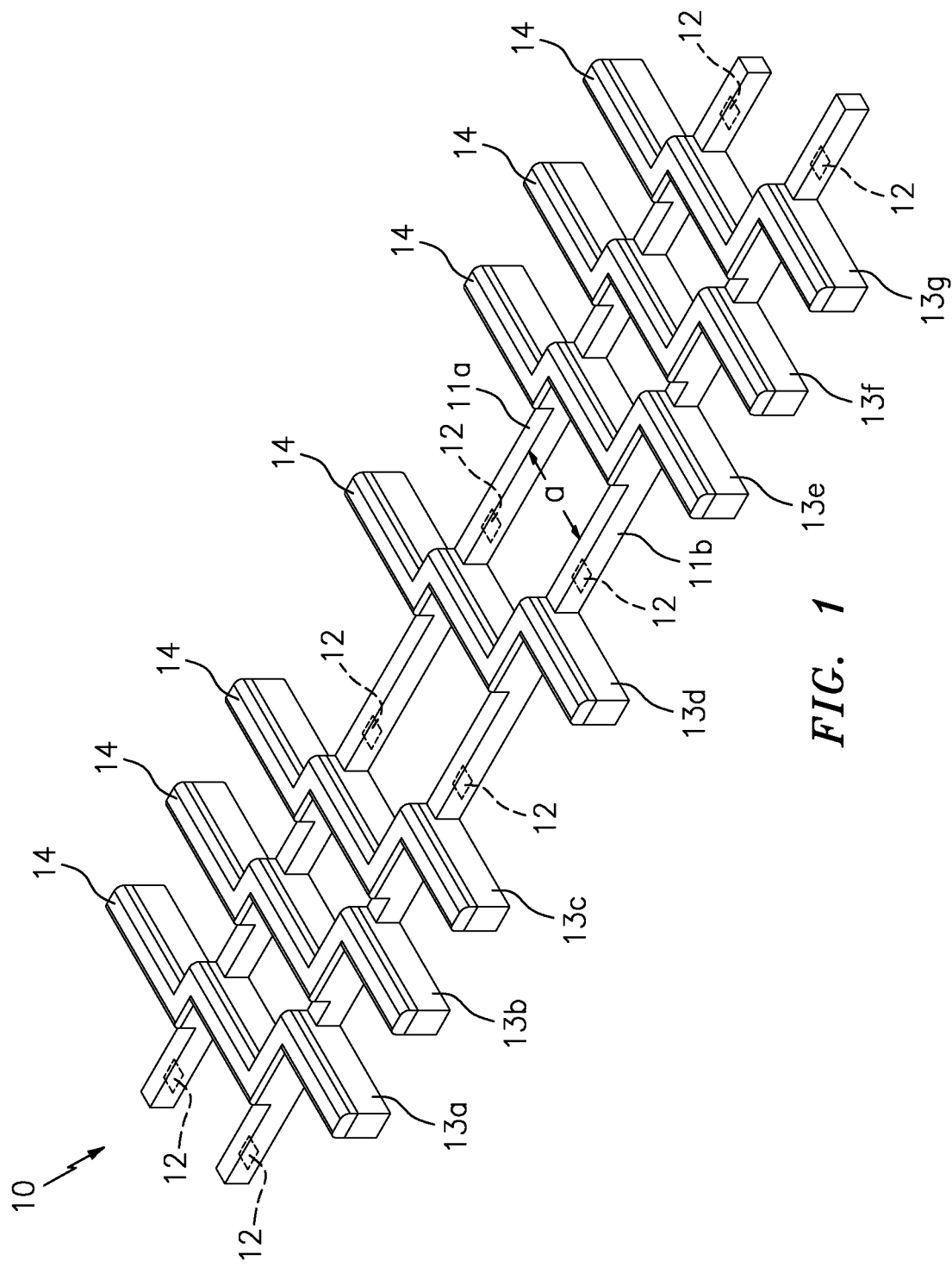
FIG. 1 is a perspective view of a keyboard finger guide that is useful for understanding the inventive concepts disclosed herein.
Figure 2:
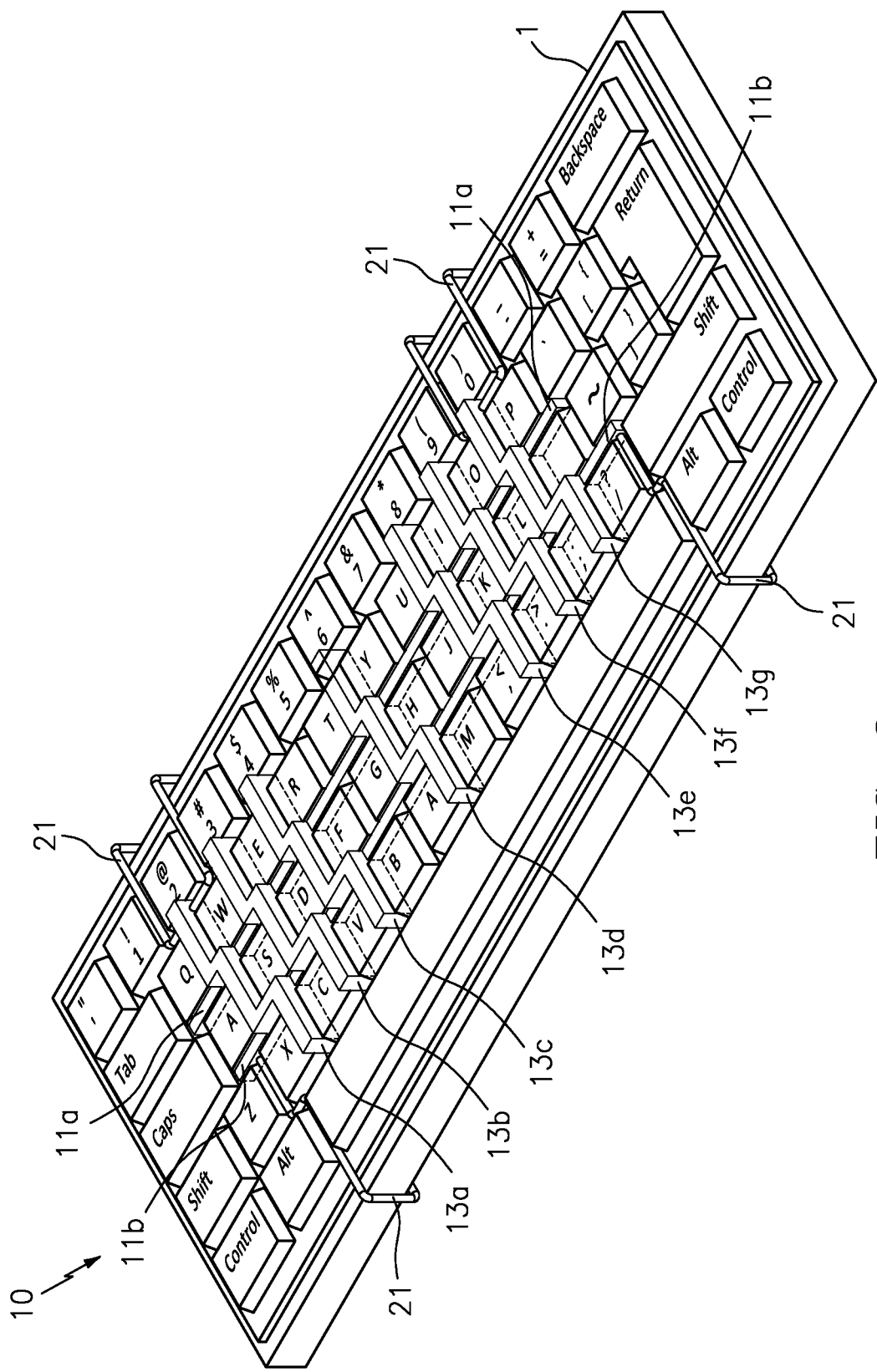
FIG. 2 is a perspective view of the keyboard finger guide in operation, in accordance with one embodiment of the invention.
Figure 3:
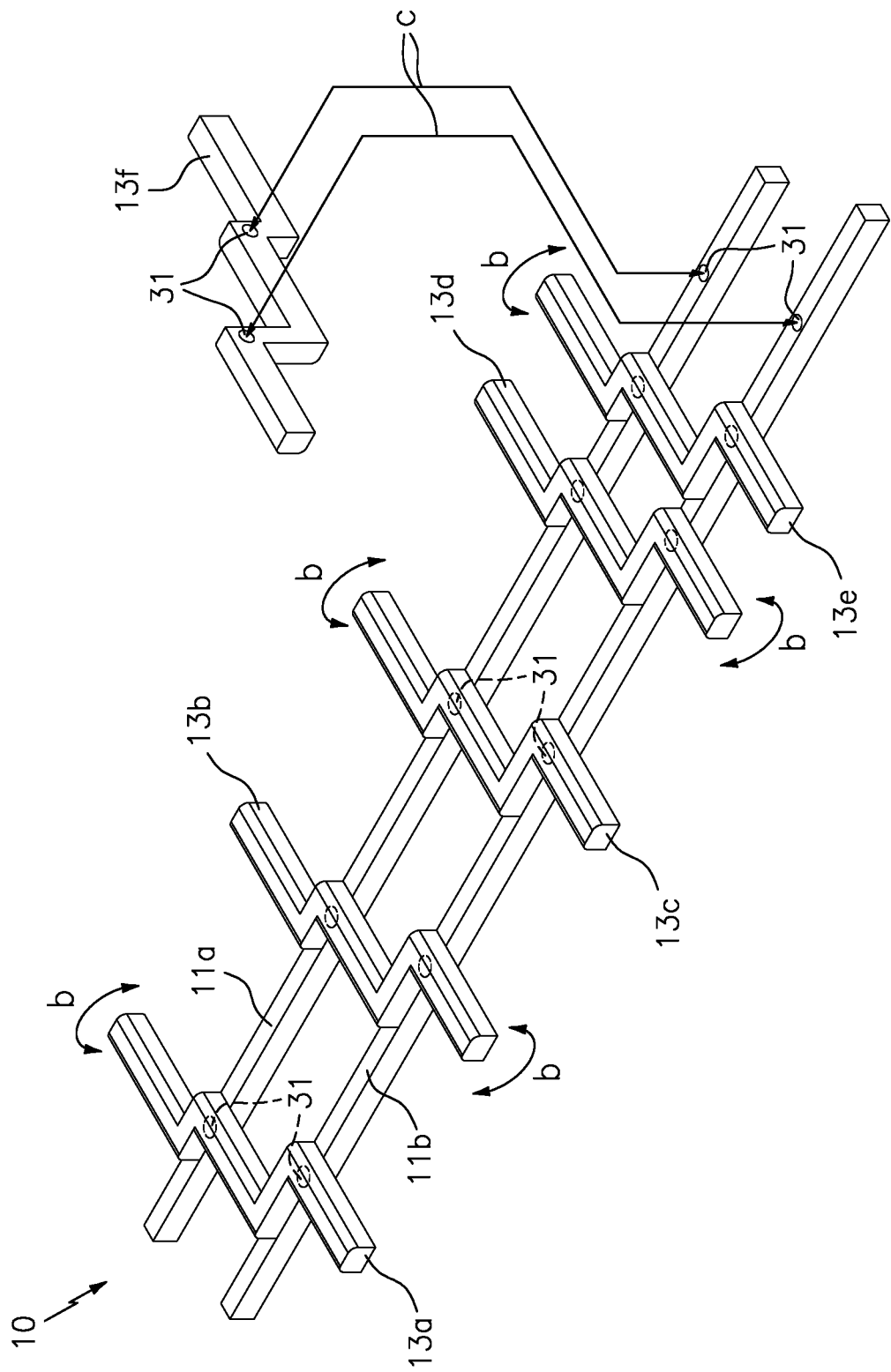
FIG. 3 is another perspective view of the keyboard finger guide, in accordance with one embodiment of the invention.

FIGS. 1-3 illustrate one embodiment of a keyboard finger placement guide device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in FIG. 1, the device 10 can include a pair of elongated planar guide members 11a and 11b that are arranged in a generally parallel relationship to each other. Each of the guide members can be constructed from any number of different lightweight materials such as plastic or memory foam, for example, and can function to be placed between the vertical rows of keys on a keyboard 1, as will be described below.

In various embodiments, the guide members 11*a* and 11*b* can include one or more magnets 12 that can be positioned along the length of the guide member so as to interact with one or more metallic components found within the body of certain keyboards (e.g., the screw locations on a laptop keyboards). Such a feature can prevent the device 10 from shifting and/or moving during operation. Although described above as including two guide members, other embodiments are contemplated wherein the device includes a fewer or greater number of guide members.

The device 10 can also include a plurality of curvilinear dividers such as dividers 13*a*, 13*b*, 13*c*, 13*d*, 13*e*, 13*f*, and 13*g*, for example (referred to hereinafter collectively at 13). Each of the dividers include a specific shape and size that is designed to run between a series of vertically offset keys, as are found on a keyboard. To this end, each of the dividers include a generally parallel relationship to each other and are arranged in a generally perpendicular orientation to the guide members 11*a* and 11*b*. In various embodiments, the dividers can be removably or permanently secured to the guide members.

The dividers 13*a*-13*g* can each be constructed from any number of different lightweight materials such as plastic, for example. In one embodiment, each of the dividers can include an upper surface 14 that is constructed from, or coated with a malleable material such as rubber, for example. The malleable upper surface can also include or be coated with a soft nonabrasive scratch resistant/preventing material such as cotton fabric or satin, for example. Such features can be particularly advantageous for use with laptop computers, for example, to allow the tops of the dividers to bend when the laptop is in the closed position so as to prevent the screen of the laptop from being scratched. Although described above as including seven dividers, other embodiments are contemplated wherein the device includes a fewer or greater number of dividers.

In the preferred embodiment, the guide members 11*a* and 11*b* can each include a length of between approximately 8.25-8.5 inches, a depth/height of between approximately 1 and 5 mm, and a separation distance (see arrow a) of between approximately 0.72-0.75 inches. Curvilinear dividers 13*a*-13*g* can each include a length of between approximately 2-3.25 inches, and a depth/height of approximately 1 and 5 mm inches. Dividers 13*a*-13*b*-13*c* and 13*e*-13*f*-13*g* can include a separation distance of approximately 0.72-0.75 inches, and divider 13*d* can include a separation distance of approximately 1.5 inches from dividers 13*c* and 13*e*. Such dimensions being suitable for operation with the somewhat standardized sizing and layout of most commercially available keyboards having individual keys that are 0.75"×0.75", and that utilize the QWERTY layout. Of course, other dimensions and component layouts are contemplated for keyboards having different shapes, sizes, languages (e.g., non-English alphabets) and/or arrangement of keys, such as the DVORAK layout, for example.

FIG. 2 illustrates one embodiment of the device 10 in operation. As shown, the two guide members 11*a* and 11*b* can be positioned above and below the row of keys beginning with the letter "A", and divider 13*a* being positioned between the keys "A" and "S". When so positioned, the remaining dividers 13*b*-13*e* will be positioned between the remaining keys as shown. In various embodiments, one or more keyboard straps 21 can engage the guides and/or dividers and be routed around the body of the keyboard 1. The strap(s) can be constructed from any number of different materials such as wire, for example, and can prevent movement of the device during operation.

In either instance, as each of the dividers 13*a*-13*g* extend partially below the upper surface of the keyboard keys, the dividers function to prevent lateral movement of the device when in use. Moreover, as each of the dividers extend above the top surface of the keyboard keys, the dividers function to provide a user with a tactile reminder of proper hand and finger placement for typing. Such a feature being particularly useful for the visually impaired and/or when typing in low light situations, for example.

Although described above as including specific components and arrangements of components, many other embodiments are also contemplated. For example, FIG. 3 illustrates one embodiment of the device 10 wherein the dividers 13*a*-13*g* are constructed entirely from a malleable material such as rubber coated wire or memory foam, for example. The ability to individually manipulate the shape of each divider (see arrows b) advantageously allows a user to manipulate the separation distances between both the dividers and the guides. Such a feature allows a single device 10 to be utilized with multiple different keyboards, each having variances in design and/or spacing of keyboard keys.

Additionally, by providing the ability to secure the dividers to the guides in a removable manner (see arrow c) via a connector 31, a device user is able to quickly and easily arrange the dividers along the guides to create unique groups user-selected keys.

Although not specifically illustrated, other embodiments are contemplated wherein multiple devices 10 can be stacked vertically for use together. Each of the devices 10 can be held in place via the magnets 12 which can be aligned so as to maintain an attractive force between the plurality of devices. Such a feature can be useful for traditional-style keyboards having extremely deep keys (e.g., keys that extend more than 0.5 cm from the base of the keyboard) by providing the ability for the user to adjust the height of the template on the keyboard.

As described herein, one or more elements of the keyboard finger placement guide device 10 can be secured together utilizing any number of known attachment means such as, for example, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A guide device for a keyboard having a plurality of individual keys, said device comprising:
    a pair of elongated guide members that are arranged in a parallel orientation;
    a plurality of dividers each having a top surface, a bottom surface, a first end, and a second end, said dividers being constructed from a first material and being arranged in a parallel orientation to each other; and
    a malleable coating that is constructed from a second material that is positioned along the top surface of each of the plurality of dividers,
    wherein the pair of elongated guide members are secured to each of the plurality of dividers in a perpendicular orientation, and at a location between the first end and second end, and
    wherein the first material is different from the second material, and the malleable coating located on the top surface of each of the dividers is configured to extend above a top surface of each of the individual keys of a keyboard.

2. The finger placement guide device of claim 1, wherein each of the dividers includes a curvilinear shape.

3. The finger placement guide of claim 2, wherein the curvilinear shape of each of the dividers is identical.

4. The finger placement guide of claim 1, wherein the plurality of dividers are permanently secured to the pair of elongated guide members.

5. The finger placement guide of claim 1, wherein the plurality of dividers are removably secured to the pair of elongated guide members.

6. The finger placement guide of claim 1, further comprising:
    a nonabrasive material that is positioned along the malleable coating located along the top end of each of the plurality of dividers.

7. The finger placement guide of claim 1, wherein each of the plurality of guides and dividers include separation distances that are configured for use with a keyboard having a QWERTY layout.

8. The finger placement guide of claim 1, wherein each of the plurality of guides and dividers include separation distances that are configured for use with a keyboard having a DVORAK layout.

9. The finger placement guide of claim 1, wherein the first material is plastic, and the second material is rubber.

10. The finger placement guide of claim 1, wherein each of the plurality of dividers is malleable and removably secured onto the pair of elongated guide members.

11. The finger placement guide of claim 1, further comprising:
    a plurality of connectors, and
    wherein each of the pair of elongated guide members are secured to each of the plurality of dividers by one of the plurality of connectors.

12. The finger placement guide of claim 11, wherein each of the plurality of connectors includes, at least one of a hook and loop material, a magnet, or a compression fitting.

13. The finger placement guide of claim 1, further comprising:
    at least one keyboard strap that is configured to engage the keyboard to prevent movement of the guide.

14. The finger placement guide of claim 1, further comprising:
    one or more magnets that are positioned along each of the pair of elongated guide members,
    wherein each of the one or more magnets being oriented toward the keyboard and being configured to be magnetically attracted to a metallic component within the keyboard to prevent movement of the guide during operation.

* * * * *